United States Patent [19]
Hosokawa et al.

[11] Patent Number: 5,638,316
[45] Date of Patent: Jun. 10, 1997

[54] MEMORY APPARATUS

[75] Inventors: Tatsuhiro Hosokawa, Ibaraki; Hitomi Kaji, Hirakata, both of Japan

[73] Assignee: Matsushita Electric Industrial Co., Ltd., Osaka, Japan

[21] Appl. No.: 550,989

[22] Filed: Oct. 31, 1995

[30] Foreign Application Priority Data

Nov. 8, 1994 [JP] Japan ................... 6-273661

[51] Int. Cl.⁶ .................................... G11C 5/02
[52] U.S. Cl. .................. 365/52; 365/189.09; 365/195; 365/230.1
[58] Field of Search ............. 365/195, 230.01, 365/52, 189.09

[56] References Cited

U.S. PATENT DOCUMENTS

| | | | |
|---|---|---|---|
| 5,130,946 | 7/1992 | Watanabe | 365/189.01 |
| 5,402,385 | 3/1995 | Ozeki et al. | 365/230.01 |

FOREIGN PATENT DOCUMENTS

| | | |
|---|---|---|
| 467355 | 1/1992 | European Pat. Off. . |
| 581253 | 2/1994 | European Pat. Off. . |
| 2-272646 | 11/1990 | Japan . |
| 2-302997 | 12/1990 | Japan . |

*Primary Examiner*—Amir Zarabian
*Assistant Examiner*—F. Niranjan
*Attorney, Agent, or Firm*—Ratner & Prestia

[57] ABSTRACT

The present invention relates to a memory apparatus to be able to do write protection and aims to protect data in a specified area in a memory device not to be easily rewritten.

When address signals A11 to A0 outputted from a microprocessor are written in the area 300 to 3FF, a CS signal from an address decoder for memory selection to a memory device is "enable" and it is possible to read from and write in the memory device. In the case in which the address signals are written in the area 3F0 to 3FF, the address decoder for write protection becomes "enable" and an output of an AND circuit is selected by a selector and is supplied to the memory device as a WE signal. If a write control signal is "enable", the WE signal outputted from the microprocessor is not masked by the AND circuit and it is possible to write in the memory device.

6 Claims, 3 Drawing Sheets

2

MEMORY APPARATUS

BACKGROUND OF THE INVENTION

(1) Field of the Invention

The present invention relates to a memory apparatus using a microprocessor and a memory device and in detail, relates to a memory apparatus for storing numbers or data such as apparatus numbers and key numbers for descrambling which are different for every apparatus used in, for example, receivers for scrambled broadcast.

(2) Description of the Prior Art

Recently, scrambled broadcast utilizing broadcast satellites and communication satellites started and have spreaded in which only receivers which fulfill a particular condition can descramble and display a normal picture.

A memory apparatus used in scrambled broadcast in accordance with the prior art is explained below referring to FIG. 1.

In FIG. 1, a microprocessor 1 outputs address signals 5 and 6 for controlling peripheral equipments such as an address decoder 2 for memory selection and a memory device 3 which is able to write and read, a write enable signal 12a (WE signal, hereafter) and a read enable signal 11a (OE signal, hereafter) and has a data bus between a memory device 3. The memory device 3 accepts a chip select signal 13 (CS signal, hereafter) which makes possible to access the memory device 3, address signal 6 necessary for indicating an entire area in the memory device 3, WE signal 12a and OE signal 11a. Microprocessor 1 and memory device 3 are connected by a data bus 4. An address decoder 2 for memory selection is supplied with address signal 5, outputs CS signal 13 and CS signal 13 is supplied to memory device 3. The performance of the memory apparatus configured as above is explained below referring to FIG. 1. For simplification of explanation, it is assumed that the memory capacity of memory device 3 is 256 addresses and microprocessor 1 outputs 12 address signals but they are not restricted to the above figures. The address signals are expressed by A11 to A0, address signals 5 share the upper addresses of 4 bits, address signals 6 share the lower addresses of 8 bits and the address area is expressed by hexadecimal numbers.

Lower address signals 6 expressed by A7 to A0 are directly inputted to memory 3 and upper address signals 5 expressed by A11 to A8 are inputted to memory 3 through address decoder 2 for memory selection as CS signal 13.

Here, for instance, the address area of memory device 3 is defined as 300 to 3FF. Therefore, address decoder 2 for memory selection is an address decoder which becomes an "enable" level when address signals 5 composed of four address signals, A11 to A8, is 0011 (in binary number), i.e. 3 (in decimal number). Accordingly, when the address signals A11 to A0 outputted from microprocessor 1 are 300 to 3FF, CS signal 13 inputted to memory device 3 becomes "enable". In this state, the data is read from memory device 3 when RE signal 11a is "enable" and the data is written in memory device 3 when WE signal 12a is "enable".

The numbers or the data which are different for every apparatus such as apparatus numbers of receivers for scrambled broadcast and key numbers for descrambling are unnecessary to rewrite if they are once stored. If they are rewrite, the receivers can not correctly perform.

In the above configuration in accordance with the prior art, however, there is a problem that there is high possibility in false rewriting of necessary data due to misoperation at writing, run away of microprocessor or noise.

SUMMARY OF THE INVENTION

To solve the above problem, the present invention offers a memory apparatus which has less possibility of false rewriting of necessary data by disabling to rewrite the important data which the receiver can not perform normally if the data is rewritten, as long as a designated process is not executed.

A memory apparatus in accordance with an exemplary embodiment of the present invention includes memory means which is able to write and read, protection area designating means for designating a part of a memory area of the memory apparatus as a protection area, address signal generating means for outputting address signals of the protection area of the memory means designated by the protection area designating means, write enable signal generating means for generating a WE signal to command writing to the memory means, control signal generating means for generating a write control signal to command writing to the protection area of the memory means, control signal detecting means for detecting that both of the WE signal and the write control signal exist, control means for controlling writing to the protection area of the memory means based on the address signals outputted from the address signal generating means, according to the output of the control signal detecting means.

The control signal detecting means of the memory apparatus is an AND circuit inputting two signals of a WE signal and a write control signal.

A key number to descramble a scrambled signal is stored in the protection area of the memory means.

Basically, a memory apparatus in accordance with an exemplary embodiment of the present invention includes:

a microprocessor including address signal generating means outputting the addresses of the protection area of the memory means, write enable signal generating means generating a WE signal and control means;

a memory device which is able to read from and write to the microprocessor; and an address decoder for write protection decoding address signals outputted from the microprocessor and indicating a part of the memory area.

Writing to the memory device is possible only in the area designated by the address decoder for write protection only when a write control signal to mask a WE signal outputted from the microprocessor and inputted to the memory device makes "enable" to write and writing is always possible in any other area.

A memory apparatus in accordance with a second exemplary embodiment of the present invention includes:

an address decoder for memory selection indicating the entire area of the memory device;

an address decoder for memory selection/write protection for decoding an area which is different from the decoded data of the address decoder for memory selection;

a selector for selecting either an output of the address decoder for memory selection or an output of the address decoder for memory selection/write protection;

in addition to the configuration of the first exemplary embodiment.

The address decoder for memory selection/write protection is "enable" by the selector when the write control signal is "write enable".

According to the basic configuration, it is impossible to write in the memory area indicated by the address decoder for write protection, as long as writing is not made "write enable" by the write control signal.

When a memory apparatus provides with an address decoder for memory selection/write protection and a selector as an additional function, it is impossible to write in the area indicated by the address decoder for write protection, as long as the write control signal is not made "write enable" and the data is written in the area indicated by the address decoder for memory selection/write protection.

Therefore, when data which the memory apparatus could not perform correctly if the data was rewritten is stored in the area indicated by the address decoder for write protection, it is possible to protect the data not to be rewritten.

DETAILED DESCRIPTION OF THE INVENTION (First Exemplary Embodiment)

A memory apparatus in accordance with a first exemplary embodiment of the present invention is explained below referring to FIG. 2, which is a block diagram of the memory apparatus.

Figure 1:
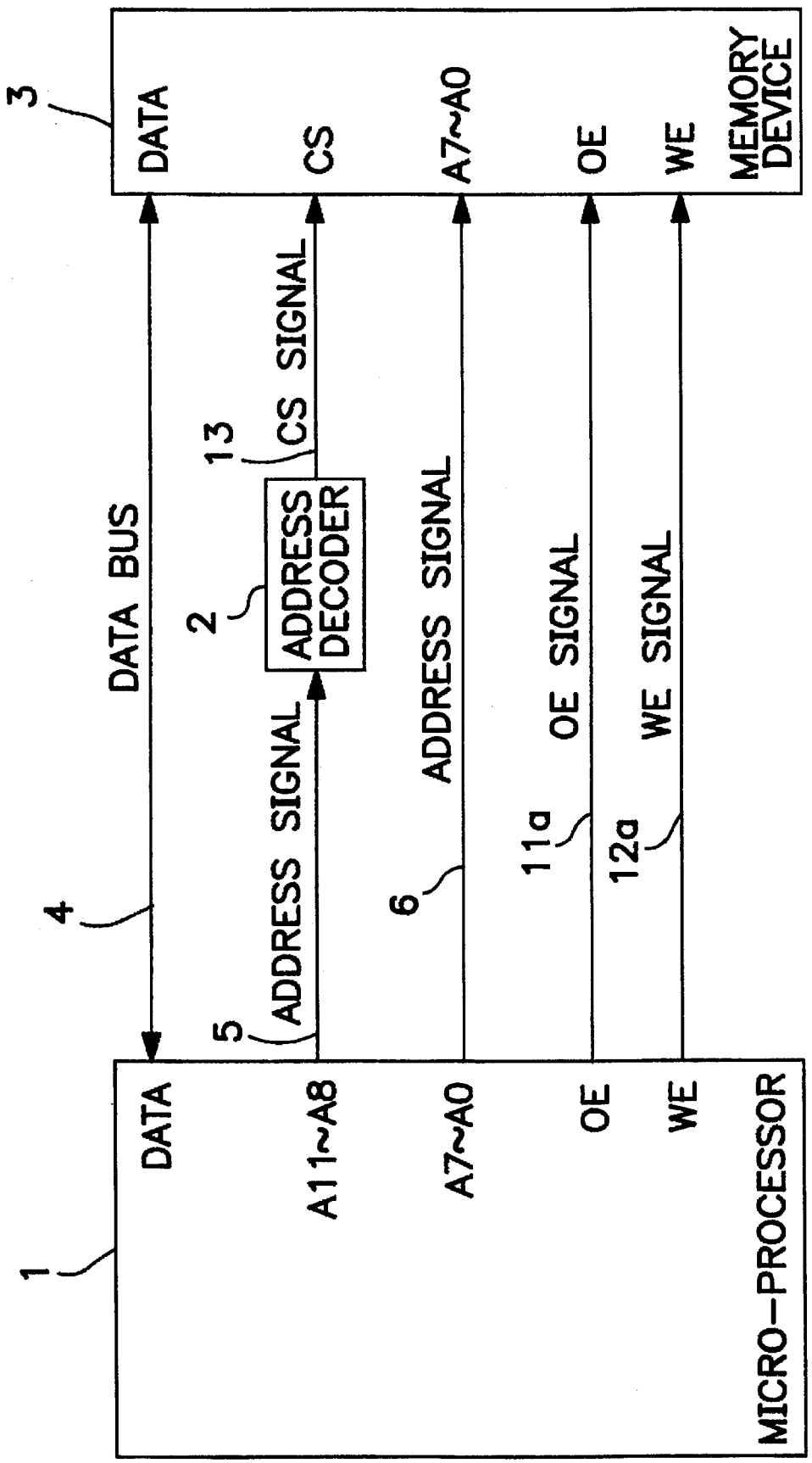
FIG. 1 is a block diagram of a memory apparatus in accordance with the prior art.
Figure 2:
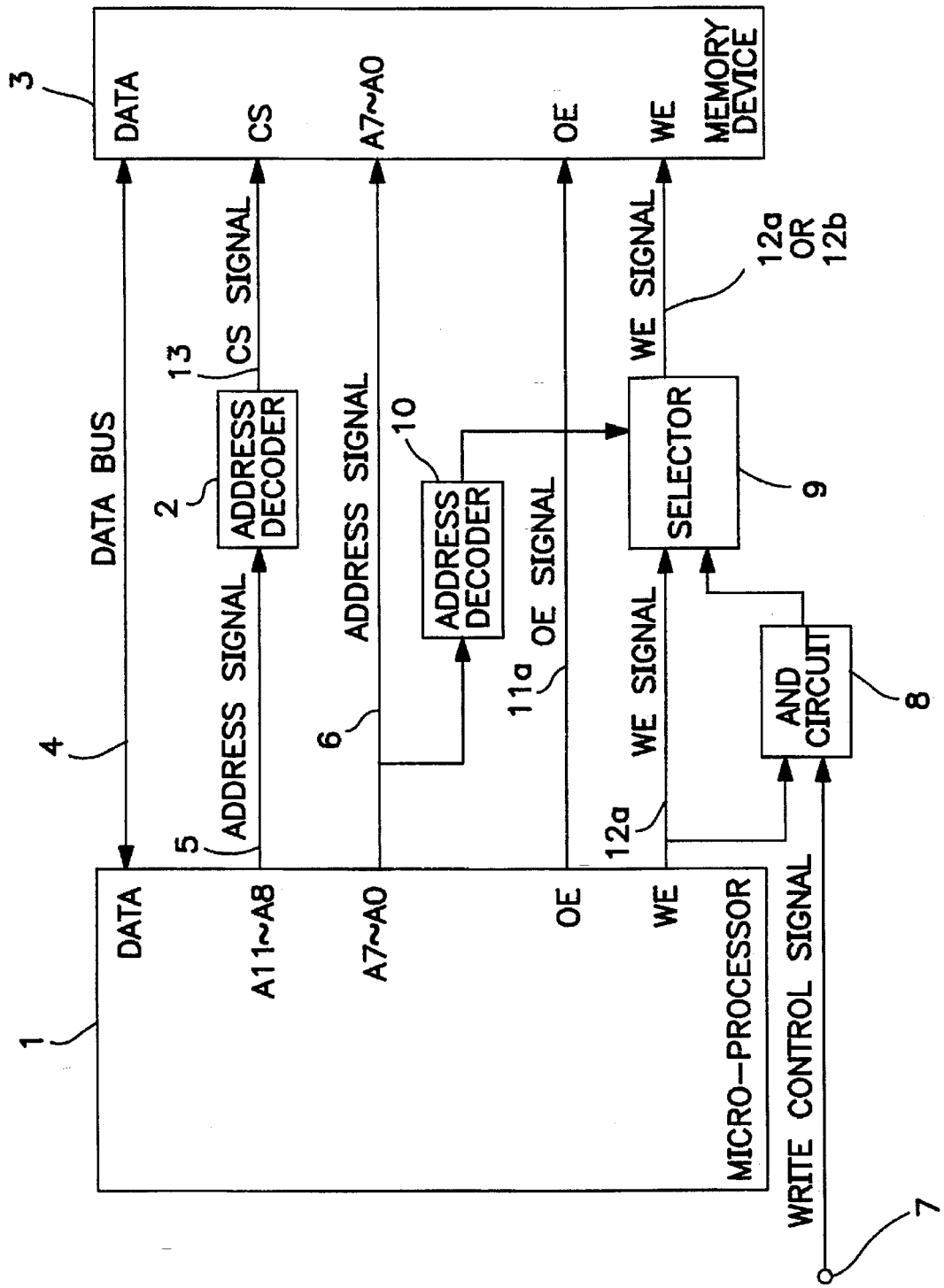
FIG. 2 is a block diagram of a memory apparatus in accordance with a first exemplary embodiment of the present invention.

In FIG. 2, a microprocessor 1, an address decoder 2 for memory selection for generating a CS signal supplied to memory device 3, a read enable and write enable memory device 3, a data bus 4, upper address signals 5, lower address signals 6, a WE signal 12a and a OE signal 11a are quite similar to those of a memory apparatus of the prior art shown in FIG. 1 and their detailed explanations are omitted.

Write control signal 7 and WE signal 12a outputted from microprocessor 1 are inputted to AND circuit 8. WE signal 12a is masked by write control signal 7 at AND circuit 8. When microprocessor 1 accesses the area indicated by address decoder 10 for write protection, selector 9 selects the output of AND circuit 8 and inputs a WE signal 12b masked by write control signal 7 to memory device 3. When microprocessor i accesses any other area, selector 9 selects WE signal 12a outputted from microprocessor 1 and inputs WE signal 12a as it is to memory device 3.

The performance of a memory apparatus configured as above in accordance with the first exemplary embodiment of the present invention is explained below.

For simplification of explanation, like in the prior art, it is defined that the address area of the memory device 3 is 300 to 3FF and the decode data for write protection of address decoder 10 for write protection is F0 to FF (this area is called write protection area, hereafter) but they are not restricted to the above figures. When address signals A11 to A0 outputted from microprocessor 1 is written in the area 300 to 3FF, CS signal 13 inputted to memory device 3 becomes "enable" and the data can be written in and read from memory device 3.

When address signals A11 to A0 are written in the area 3F0 to 3FF, address decoder 10 for write protection becomes "enable" level. Selector 9 selects the output of AND circuit 8 and supplies it to memory device 3 as a WE signal 12b.

If write control signal 7 is "enable" level, WE signal 12a outputted from microprocessor 1 is not masked at AND circuit 8 and writing to memory device 3 becomes "enable".

If write control signal 7 is "disable" level, WE signal 12a is masked by AND circuit 8 and writing to memory device 3 becomes "disable" because WE signal 12b supplied to memory device 3 is not active.

Reading is possible if CS signal 13 inputted to memory device 3 is "enable" level and OE signal is "enable" and reading is possible for the entire area where the addresses A11 to A0 are 300 to 3FF.

(Second Exemplary Embodiment)

A memory apparatus in accordance with a second exemplary embodiment of the present invention is explained below referring to FIG. 3, which is a block diagram of the memory apparatus.

Figure 3:
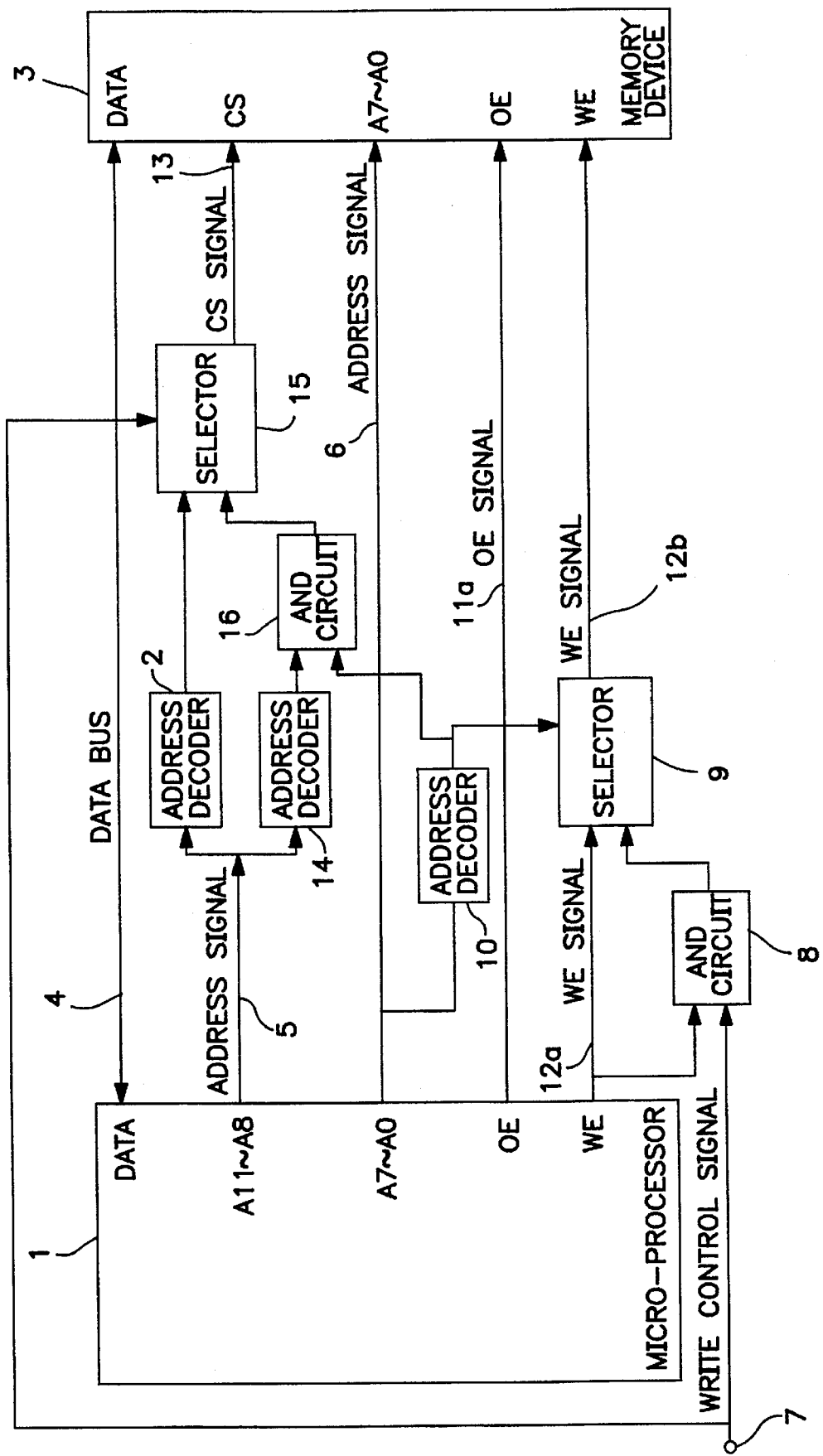
FIG. 3 is a block diagram of a memory apparatus in accordance with a second exemplary embodiment of the present invention.

In FIG. 3, microprocessor 1, an address decoder 2 for memory selection, a memory device 3, a data bus 4, upper address signals 5, lower address signals 6, an AND circuit 8, a selector 9, an address decoder 10 for write protection, a WE signal 12a and an OE signal 11a are quite similar to those of a memory apparatus of the first exemplary embodiment of the present invention shown in FIG. 2 and their detailed explanations are omitted.

The difference from the configuration shown in FIG. 2 is that an address decoder 14 for memory selection/write protection, a selector 15 and an AND circuit 16 are newly added.

The output of address decoder 14 for memory selection/write protection inputted with address signals 5 and the output of address decoder 10 for write protection are inputted to AND circuit 16 and AND data of both inputs are made at AND circuit 16.

The output of address decoder 2 for memory selection and the output of AND circuit 16 are inputted to selector 15 and selector 15 selects either of two inputs by write control signal 7 and outputs CS signal 13 to memory device 3.

The performance of the memory apparatus in accordance with the second exemplary embodiment of the present invention is explained below, especially about the different configuration from the first exemplary embodiment.

For simplification of explanation, like in the first exemplary embodiment, it is defined that the address area of the memory device 3 is from 300 to 3FF, the decoded data at address decoder 2 for memory selection is 3 (i.e. 0011), the decoded data at address decoder 10 for write protection is F0 to FF and the decoded data at address decoder 14 for memory selection/write protection is F but they are not restricted to the above data.

When write control signal 7 is "disable", because selector 15 selects an output of address decoder 2 for memory selection so that the selected signal is supplied to memory device 3 as a CS signal 13, the second exemplary embodiment performs similarly to the first exemplary embodiment. That is, because address decoder 2 for memory selection inputs a signal which is "enable" to memory device 3 as a CS signal 13 when inputted address signals 5 are 3 (0011), it is possible to read when address signal A11 to A0 is 300 to 3FF and it is possible to write when address signals A11 to A0 are 300 to 3EF.

However, because in the write protection area 3F0 to 3FF, address decoder 10 for write protection controls selector 9 and selector 9 selects an output of AND circuit 8, WE signal 12a outputted from microprocessor 1 is masked by "disable" of write control signal 7 and is inputted to memory 3 as a WE signal 12b. Thus, memory 3 becomes impossible to write and only possible to read.

When write control signal 7 is "enable", selector 15 is switched to select an output of AND circuit 16 by write control signal 7.

Therefore, AND circuit 16 takes a logical multiplication of the output of address decoder 14 for memory selection/write protection and the output of address decoder 10 for write protection indicating write protection area and inputs it to memory 3 as a CS signal 13 through selector 15.

Only when the data supplied from microprocessor 1 to address decoder 14 for memory selection/write protection is F and the data supplied from microprocessor 1 to address decoder 10 for write protection is F0 to FF, that is the area of address signals A11 to A0 is FF0 to FFF, CS signal 13 inputted to memory 3 becomes "enable".

At this time, selector 9 is controlled by an "enable" signal of address decoder 10 for write protection, like as the first exemplary embodiment, and selects an output of AND circuit 8 to mask WE signal 12a outputted from microprocessor 1. However, because write control signal 7 is "enable", WE signal 12a is not masked and it becomes possible to write in memory 3.

That is, in the second exemplary embodiment, when data is written in the write protection area, the data has to be written by making write control signal 7 "enable" level and making upper address signals A11 to A8 the data F of the different area from the decode data 3 of address decoder 2 for memory selection.

After the data necessary for write protection area 3F0 to 3FF is written, write control signal is held at "disable" level. Therefore, when address signals A11 to A0 are 300 to 3EF, both reading and writing are possible and only reading becomes possible at write protection area 3F0 to 3FF.

In the second exemplary embodiment, only the output of address decoder 14 for memory selection/write protection may be directly inputted to selector 15, eliminating AND circuit 16. It is inferior in write protection function than the second exemplary embodiment but can perform and is simple in circuit configuration.

In the above-described exemplary embodiments of the present invention, the memory area, the number of address buses, the decode data of the address decoders, etc. are only an example and they are not restricted to those data.

As explained above, a memory apparatus in accordance with the first exemplary embodiment of the present invention includes a microprocessor, a memory device which is possible to read and write, an address decoder for memory selection which generates a CS signal for the memory device, an AND circuit for masking a WE signal outputted from the microprocessor by a write control signal, an address decoder for write protection indicating a write protection area, and a selector for selecting the WE signal masked by a write control signal at the write protection area and inputting it to the memory device as a WE signal, wherein writing to the write protection area is possible only when the write control signal allows to write in the memory device.

In addition to the first exemplary embodiment, a memory apparatus in accordance with the second exemplary embodiment of the present invention includes an address decoder for memory selection and write protection inputted with an address signal, an AND circuit for obtaining a logical multiplication of the output of the address decoder for memory selection and write protection and the output of the address decoder for write protection, a selector for selecting by a write control signal either the output of the AND circuit or the output of the address decoder for memory selection generating a CS signal to the memory device. Thus, it is possible to move the write address from the outside of the write protection area to the inside of the write protection area. Therefore, the possibility to be rewritten due to such as misoperation or noise by storing the data which can not normally operate if rewritten, in the write protection area.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A memory apparatus comprising:

memory means having a memory area comprising a plurality of addressable data storage locations;

write protection area designating means for designating a part of the addressable data storage locations existing in the memory area of said memory means as a write protection area;

address signal generating means for outputting an address signal existing in the write protection area of said memory means designated by said write protection area designating means;

write enable signal generating means for generating a write enable signal to command writing in said memory means;

control signal generating means for generating a write control signal to command writing in the write protection area of said memory means;

control signal detection means for detecting that said write enable signal and said write control signal have been generated; and control means for controlling writing in the write protection area of said memory means based on the address signal outputted from said address signal generating means, responsive to an output signal of said control signal detection means.

2. A memory apparatus as recited in claim 1, wherein:

said control signal detection means comprises an AND circuit responsive to said write enable signal and said write control signal.

3. A memory apparatus as recited in claim 1, wherein:

a key number to descramble a scrambled signal is stored in said write protection area of said memory means.

4. A memory apparatus as recited in claim 1, further comprising:

a microprocessor comprising said address signal generating means, said write enable signal generating means and said control means, wherein said microprocessor writes data in the write protection area of said memory means based on the address signal outputted from said address signal generating means, responsive to the output signal of said control signal detection means.

5. A memory apparatus comprising:

a microprocessor;

a memory device having an area including a plurality of addressable data storage locations which is able to read and write data from said microprocessor; and an address decoder for write protection for decoding an address signal representing one of the plurality of addressable data storage locations of said memory device outputted from said microprocessor and indicating a first part of the area of said memory device; and wherein writing in the first part of the area of said memory device only when a write control signal enables writing by determining if writing to said memory device is made "enable", and writing is always possible in a second part of the area.

6. A memory apparatus as recited in claim 5 comprising:

an address decoder for memory selection indicating the area existing in said memory device;

an address decoder for memory selection/write protection for decoding an addressable data storage location of an area outside the area existing in said memory device;

a selector for selecting one of an output of said address decoder for memory selection and an output of said address decoder for memory selection/write protection; and wherein said selector sets said address decoder for memory selection/write protection to "enable" when said write control signal is "write enable".

* * * * *

UNITED STATES PATENT AND TRADE MARK OFFICE
CERTIFICATE OF CORRECTION

PATENT NO.   : 5,638,316
DATED        : June 10, 1997
INVENTOR(S)  : Hosokawa et al.

It is certified that error appears in the above-identified patent and that said Letters Patent is hereby corrected as shown below:

On the cover page, item [56] References Cited, OTHER PUBLICATIONS, add the following reference:

Doar et al., "Interfacing Considerations for Mitsubishi Memory Cards", MICROPROCESSORS AND MICROSYSTEMS, vol. 14, no. 7, pgs. 479-482, September 1990.

Signed and Sealed this

Second Day of December, 1997

*Attest:*

BRUCE LEHMAN

*Attesting Officer*   *Commissioner of Patents and Trademarks*